S. C. MOORHEAD.
UNIVERSAL JOINT.
APPLICATION FILED MAR. 24, 1909.
961,634.
Patented June 14, 1910.
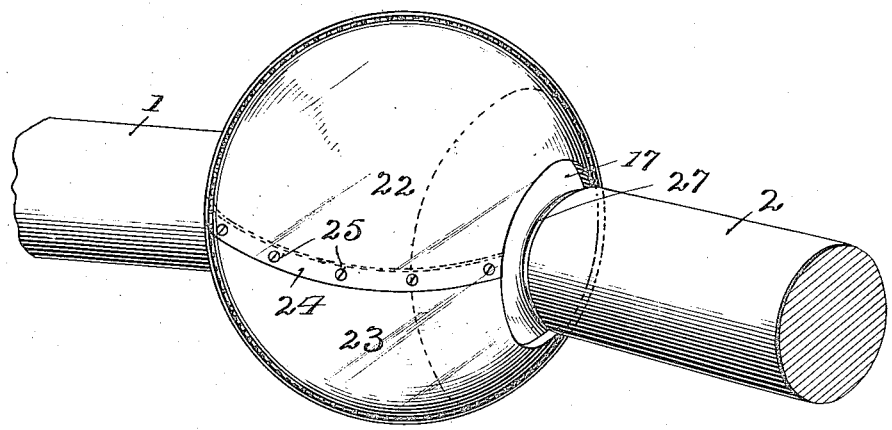
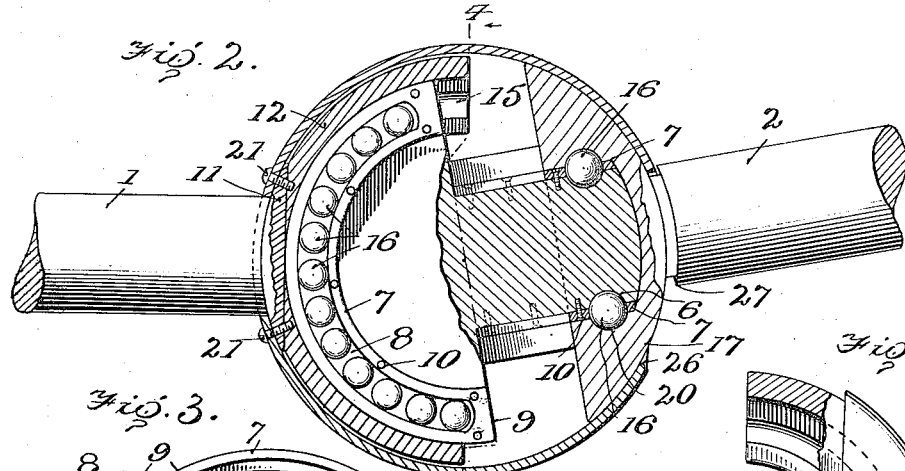
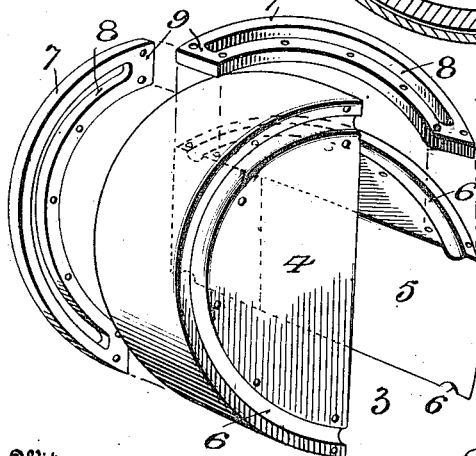
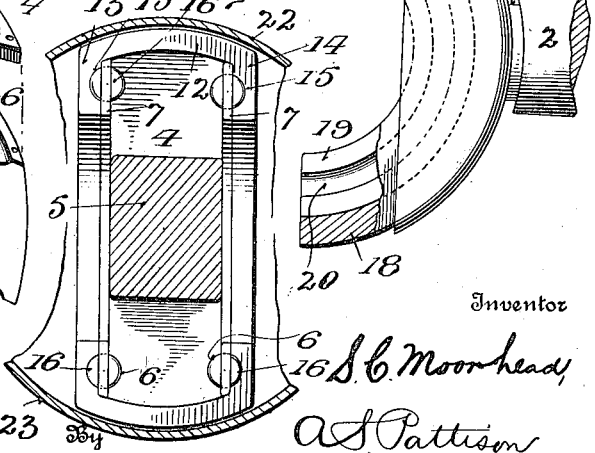

UNITED STATES PATENT OFFICE.

SAMUEL C. MOORHEAD, OF CLEVELAND, OHIO.

UNIVERSAL JOINT.

961,634.  Specification of Letters Patent. Patented June 14, 1910.

Application filed March 24, 1909. Serial No. 485,459.

*To all whom it may concern:*

Be it known that I, SAMUEL C. MOORHEAD, a citizen of the United States, residing at Cleveland, in the county of Cuyahoga and State of Ohio, have invented certain new and useful Improvements in Universal Joints, of which the following is a specification, reference being had therein to the accompanying drawing.

My invention relates to improvements in universal joints.

The object of my invention is to provide a universal joint for coupling the two ends of a shaft together, and by means of the ball bearings the friction is reduced, whereby a great advantage is gained.

Another object of my invention is to provide a more simple, cheap and effective joint, and also provide means whereby an oil casing is attached and renders the joint practically oil tight.

In the accompanying drawings, Figure 1, is a perspective view of my improved joint showing it connecting the two ends of a shaft. Fig. 2, is a vertical, longitudinal, sectional view of Fig. 1. Fig. 3, is a perspective view of the connecting member and showing the ball retainers removed and in perspective. Fig. 4, is a vertical, transverse, sectional view taken on the line 4—4 of Fig. 2. Fig. 5, is a side elevation of one end of one shaft, showing the outer end broken away to show the ball race.

Referring now to the drawings, 1 and 2 represent the two ends of the shaft to be connected by my improved universal joint, whereby either end of the sections may be moved out of alinement with the other end, as is well understood in joints of this character.

My improved connecting member 3 consists of two semi-circular sections 4 and 5 set at right angles to each other, and rigidly secured together. I preferably show these two sections formed integral, although they might be riveted, welded, or otherwise secured together, as this would not affect the advantages and operation of my joint. The sections, as before stated, are set at right angles having their diameters abutting, and secured together as before stated. The sides of said section adjacent their peripheries are provided with ball-races 6, each race on each section running around the sides of the section concentric with the periphery thereof. These ball-races have their ends open, as clearly shown in Figs. 2 and 3, of the drawings. In order to retain the balls in the races, I provide the retainers 7 which are of a semi-circular form and have the slots 8 with closed ends 9, and said slots correspond with the ball-races. These retainers are secured upon the sections by means of screws 10. Each ball-race is provided with a retainer, and as each side of each member has a ball-race, it will be seen that there are four races and four retainers, whereby each side of each section is provided with a ball-race and a retainer.

The shaft section 1 is provided with a spherical-shaped portion 11 carrying the semi-circular member 12. This member 12 is U-shaped in cross-section, and the vertical walls 13 and 14 are provided with ball-races 15 corresponding with the ball-races in the plate 4. Balls 16 carried by the groove 8 of the retainer 7, rest in the races 6 and 15, whereby the shaft section is locked upon the connecting member, yet the shaft section has a vertical movement.

The shaft section 2 is provided with a spherical portion 17 of an enlarged form, which forms a part of the semi-circular portion 18 of the shaft section. This portion 18 is U-shaped in cross-section, the same as the member 12, and the horizontal walls 19 are provided with ball-races 20 in which the balls work in conjunction with the race 6 of the plate 5, whereby the shaft section 2 may swing horizontally independent of the connecting member.

Secured to the spherical portion 11 of the shaft section by screws 21, is an oil case formed in two sections 22 and 23. The sections are hemi-spherical and have their edges overlapping, as indicated at 24, and secured together by screws 25. The oil case is cut away as indicated at 26, and is adapted to closely fit the spherical portion 17 and form a tight joint therewith, whereby when the shaft section 2 is moved, or the shaft section 1 is moved, the oil case travels over the portion 17 and at all times forms a tight joint to prevent the oil from leaking from the case. In order to allow a greater movement of the shaft section without increasing the size of the portion 17, I cut the shaft section 2 away, as indicated at 27, or form a circular groove around the same, whereby the case may extend into the same for allowing a greater movement of the shaft sections.

By the construction herein set forth, it will be seen that the two shaft sections are movable independent of each other at right angles to each other, and the balls reduce the friction and at the same time allow of means whereby the two sections are secured together against longitudinal movement.

Having thus described my invention, what I claim and desire to secure by Letters Patent, is:—

1. A universal joint comprising a central connecting member formed of two semicircular plates having ball races on opposite sides concentric with the periphery thereof, retainers carried by the plates opposite the races, shaft sections having pockets receiving the plates and having ball recesses opposite the retainers.

2. A universal joint comprising a central connecting member formed of two semicircular plates having ball races on opposite sides concentric with the periphery thereof, shaft sections having pockets receiving the plates and having ball recesses opposite the recesses in the plates, balls in said recess, and ball retainers carried by the semi-circular plates.

3. A universal joint comprising a central connecting member formed of two semicircular plates having ball recesses on opposite sides concentric with the periphery thereof, retainers carried by the plates opposite the recesses, the periphery of said plates being spherical, shaft sections having pockets receiving the plates and having ball recesses opposite the recesses in the plates, balls in said recesses, a spherical oil casing carried by one shaft section, and a spherical portion carried by the other shaft section closely fitting the inner periphery of the oil casing.

4. A universal joint comprising a central connecting member formed of two semicircular plates secured together at right angles to each other and having ball races on opposite sides concentric with the periphery thereof, ball retainers carried by the said plates opposite the recesses, the periphery of said plates being spherical, shaft sections having pockets receiving the plates and having ball recesses opposite the recess in the plates, balls in said recesses and spherical portions carried by the pockets adjacent the shaft, and a spherical oil casing rigidly carried by the spherical portion of one pocket and snugly fitting the periphery of the spherical portion carried by the other shaft.

5. A universal joint comprising a central connecting member formed of two semicircular plates secured together at right angles to each other and having ball races on opposite sides concentric with the periphery thereof, semi-circular ball retainers screwed to the sides of said plates and adapted to hold the balls in the grooves in the plates, shaft sections having semi-circular pockets receiving the plates and having ball races to receive the balls carried by the plates and retainers.

In testimony whereof I affix my signature in presence of two witnesses.

SAMUEL C. MOORHEAD.

Witnesses:
J. C. HEALD,
E. A. SIMONS.